(12) United States Patent
Gustafsson et al.

(10) Patent No.: US 8,327,617 B2
(45) Date of Patent: Dec. 11, 2012

(54) OUTLET NOZZLE FOR A JET ENGINE, AN AIRCRAFT COMPRISING THE OUTLET NOZZLE AND A METHOD FOR CONTROLLING A GAS FLOW FROM THE JET ENGINE

(75) Inventors: Bernhard Gustafsson, Göteborg (SE); Anders Lundbladh, Trollhättan (SE)

(73) Assignee: Volvo Aero Corporation, Trollhättan (SE)

( * ) Notice: Subject to any disclaimer, the term of this patent is extended or adjusted under 35 U.S.C. 154(b) by 1322 days.

(21) Appl. No.: 11/577,506

(22) PCT Filed: Nov. 1, 2005

(86) PCT No.: PCT/SE2005/001646
§ 371 (c)(1),
(2), (4) Date: Apr. 19, 2007

(87) PCT Pub. No.: WO2006/049568
PCT Pub. Date: May 11, 2006

(65) Prior Publication Data
US 2007/0271901 A1    Nov. 29, 2007

(30) Foreign Application Priority Data

Nov. 5, 2004  (SE) .................................... 0402715
Dec. 2, 2004  (SE) .................................... 0402951

(51) Int. Cl.
F02K 1/28 (2006.01)
(52) U.S. Cl. .................. 60/231; 60/770; 239/265.17

(58) Field of Classification Search .................... 60/231, 60/269, 770, 771, 228, 229; 239/265.17, 239/265.23, 265.25
See application file for complete search history.

(56) References Cited

U.S. PATENT DOCUMENTS

| 3,016,699 A | 1/1962 | Bertin et al. |
| 3,354,645 A * | 11/1967 | Hsia ................................. 60/204 |
| 4,069,977 A | 1/1978 | Vaughan |

(Continued)

FOREIGN PATENT DOCUMENTS
WO    9620867 A1    7/1996

OTHER PUBLICATIONS

International Search Report from corresponding International Application PCT/SE2005/001646.

*Primary Examiner* — Phutthiwat Wongwian
(74) *Attorney, Agent, or Firm* — WRB-IP LLP

(57) ABSTRACT

An outlet nozzle for a jet engine has a gas intake and a gas outlet, at least one opening being provided through the nozzle boundary wall for the injection of a fluid into the nozzle in a direction perpendicular to one plane, for the purpose of controlling the direction of a gas flow from the jet engine so that vectoring occurs substantially tangentially in this plane. A first opening configuration is provided through the nozzle boundary wall on a first side of the nozzle center line and a second opening configuration is provided through the nozzle boundary wall on a second side of the nozzle center line. At least one of said first and second opening configurations has a substantial extension in the axial direction of the nozzle, in order to permit selective injection of the fluid through said opening configuration to a varying extent in the axial direction of the nozzle.

25 Claims, 6 Drawing Sheets

U.S. PATENT DOCUMENTS

| | | | |
|---|---|---|---|
| 4,351,479 A * | 9/1982 | Kranz et al. | 239/265.23 |
| 4,754,927 A * | 7/1988 | Fitzgerald | 239/265.17 |
| 5,435,489 A | 7/1995 | Jenkins et al. | |
| 5,706,650 A | 1/1998 | Thayer | |
| 5,833,139 A * | 11/1998 | Sondee et al. | 239/265.17 |
| 5,996,936 A * | 12/1999 | Mueller | 244/53 R |
| 6,112,513 A * | 9/2000 | Catt et al. | 60/204 |
| 6,336,319 B1 * | 1/2002 | Koshoffer | 60/770 |
| 6,679,048 B1 * | 1/2004 | Lee et al. | 60/204 |
| 6,962,044 B1 * | 11/2005 | Miller et al. | 60/230 |
| 7,481,038 B2 * | 1/2009 | Blozy et al. | 60/228 |
| 7,509,797 B2 * | 3/2009 | Johnson | 60/228 |
| 7,658,337 B2 * | 2/2010 | Avenell | 239/265.17 |

* cited by examiner

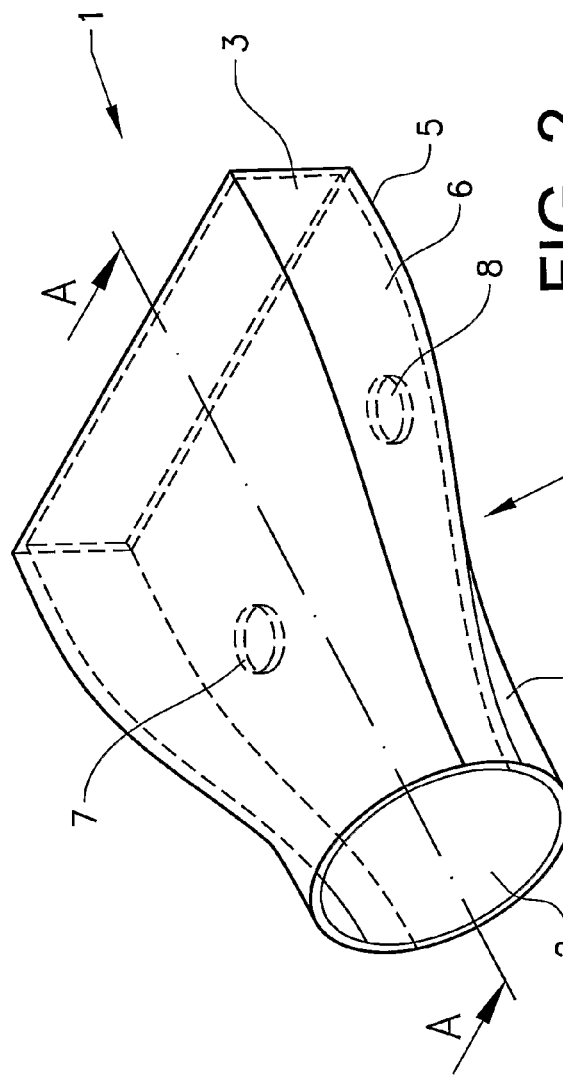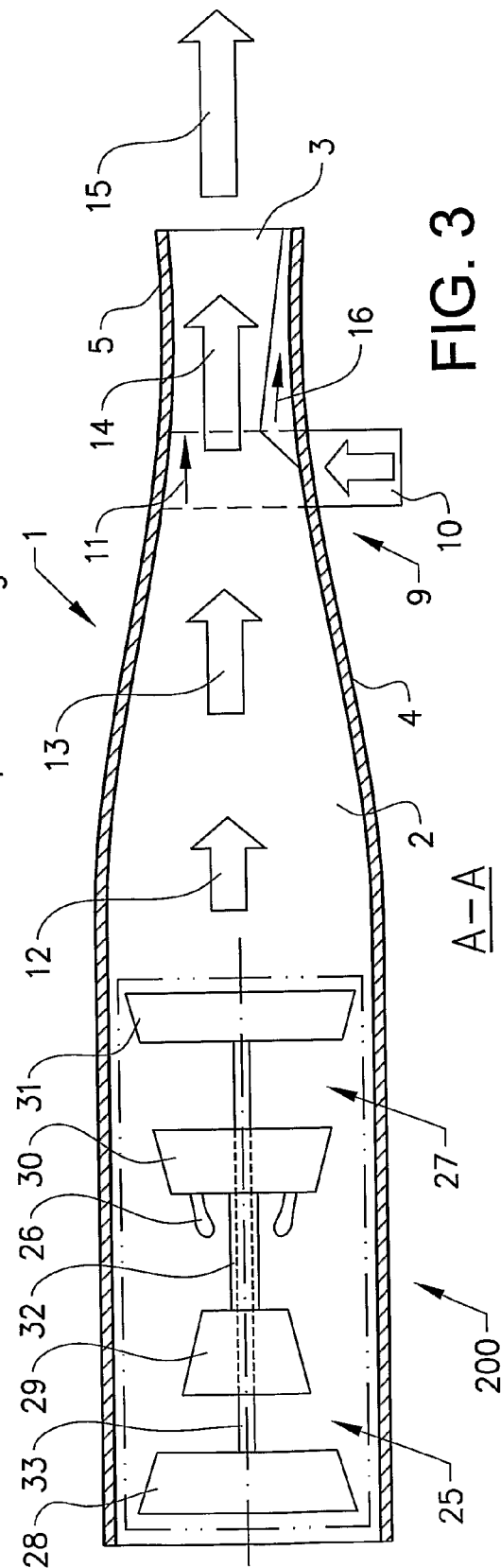

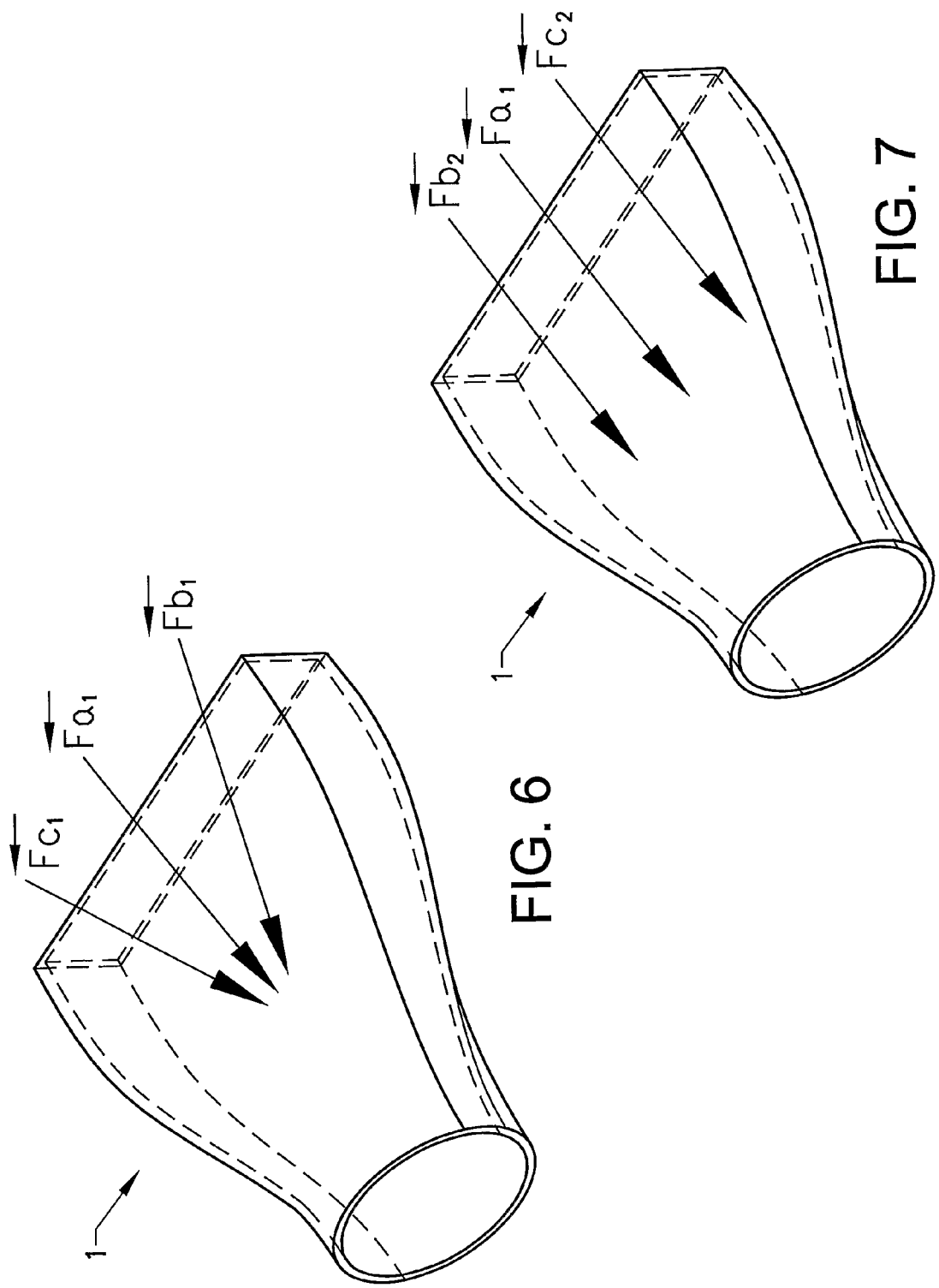

OUTLET NOZZLE FOR A JET ENGINE, AN AIRCRAFT COMPRISING THE OUTLET NOZZLE AND A METHOD FOR CONTROLLING A GAS FLOW FROM THE JET ENGINE

BACKGROUND AND SUMMARY

The present invention relates to an outlet nozzle for a jet engine, the nozzle having a gas intake and a gas outlet, at least one opening being provided through the nozzle boundary wall for the injection of a fluid into the nozzle in a direction perpendicular to one plane, for the purpose of controlling the direction of a gas flow from the jet engine, so that vectoring occurs substantially tangentially in this plane.

In other words a secondary air flow is injected from below (and/or from above) into the primary exhaust gas flow from the jet engine in order to produce a lateral displacement/reorientation of the thrust from the primary exhaust gas flow. The invention therefore relates to thrust vectoring.

The invention further relates to a method for controlling a gas flow from the jet engine.

The term jet engine is intended to include various types of engines which take in air at a relatively low velocity, heat it up through combustion and expel it at a much higher velocity. The term jet engine includes turbojet engines and turbofan engines, for example.

The jet engine conventionally comprises a compressor section for compression of the intake air, a combustion chamber for combustion of the compressed air and a turbine section arranged behind the combustion chamber, the turbine section being rotationally connected to the compressor section in order to drive this by means of the energy-rich gas from the combustion chamber. The compressor section usually comprises a low-pressure compressor and a high-pressure compressor. The turbine section usually comprises a low-pressure turbine and a high-pressure turbine. The high-pressure compressor is rotationally locked to the high-pressure turbine via a first shaft and the low-pressure compressor is rotationally locked to the low-pressure turbine via a second shaft.

The jet engine can be used for the propulsion of various types of jet-propelled craft including both land and waterborne craft, but the invention is primarily intended for applications in an aircraft, and in particular in an airplane engine.

Protecting an airplane against possible attack by giving the airplane a low so-called signature is already known. The term signature in this context refers to the contrast with the background. A craft should have a low radar signature. Vertical surfaces or edges can give rise to a radar signature. One method for reducing the radar signature is therefore to eliminate the vertical tail fin. A craft without a tail fin and rudders arranged thereon has to have some other method for lateral control.

A known method for controlling the craft is to arrange moveably mounted fins/ridges in the outlet nozzle, said fins/ridges extending along an inner boundary wall in the nozzle and forming ramps . By controlling the alignment of the fins/ramps relative to the nozzle, it is possible to control the outlet jet from the jet engine in a lateral direction and thereby to control the sideways movement of the craft.

Another known method for controlling the craft is to arrange a number of injection ports in the outlet nozzle and to inject a secondary air flow into the primary exhaust gas flow from the engine via the injection ports. More specifically, the secondary air flow is injected into the nozzle in a direction perpendicular to one plane, for the purpose of controlling the direction of the primary exhaust gas flow from the jet engine, so that thrust vectoring occurs substantially tangentially in this plane.

It is desirable to produce an outlet nozzle for a jet engine, which creates the prerequisites for better control of a craft than in the state of the art. It is desirable specifically to create an outlet nozzle which will afford greater facilities for vectoring. It is also desirable to provide a robust construction having a long service life.

According to an aspect of the present invention, an outlet nozzle has a first opening configuration is provided through the nozzle boundary wall on a first side of the nozzle center line and a second opening configuration is provided through the nozzle boundary wall on a second side of the nozzle center line, at least one of said first and second opening configurations has a substantial extension in the axial direction of the nozzle in order to permit selective injection of the fluid through said opening configuration to a varying extent in the axial direction of the nozzle.

Saying that the opening configuration "has a substantial extension" is here intended to signify more than a punctual/discrete extension and in particular a extension that is sufficient to allow injection of the fluid through the opening configuration to a varying extent in the axial direction of the nozzle.

This solution means that no moving parts are required for controlling the jet from the jet engine, which creates the prerequisites for a long service life, as the environment in the outlet nozzle is aggressive with very high, thermal loads.

According to an aspect of the invention both the first and second opening configuration have a substantial extension in the axial direction of the nozzle. This creates the prerequisites for controlling the gas flow in the lateral direction of the nozzle through selective injection of the fluid to a varying extent in the axial direction of the nozzle on different sides of the nozzle center line.

According to an aspect of the invention, at least one of said first and second opening configurations comprises at least one elongated opening structure. The elongated opening structure preferably extends basically in a straight line. By suitably controlling the fluid injection through the opening(s), it is possible to influence the primary gas flow (the exhaust gas flow from the engine) in a manner consistent with the fact that the inner boundary surface of the nozzle comprises a physical ramp/elongated raised section.

According to an aspect of the invention, a third opening configuration is provided through the nozzle boundary wall on an opposite side of the first opening configuration in relation to the nozzle interior. Only injecting the secondary air flow into the primary exhaust gas flow from one direction can in certain operating situations produce a certain unwanted tendency to pitching. By injecting secondary air flows into the primary exhaust gas flow from opposite directions, it is possible to neutralize the pitching tendency and thereby to obtain an improved yaw function.

It is also desirable to provide a method for controlling a gas flow in an outlet nozzle for a jet engine, which provides an alternative method for controlling a craft to the state of the art.

According to an aspect of the invention, an effective minimum area for the gas flow is regulated differently on different sides of a center line through the nozzle by controlling the quantity and/or the direction of fluid injected into the nozzle in order to control the gas flow. This is usually referred to as vectoring.

By selecting a different size and/or axial position for the minimum area on different sides of the nozzle center line, the gas flow (the jet) can be parallel-shifted and/or deflected laterally. Both of these effects provide a torque which can be used to control the craft.

BRIEF DESCRIPTION OF THE DRAWINGS

The invention will be described in more detail below with reference to the embodiments shown in the drawings attached, in which:

FIG. 2 shows a perspective plan view in a basic diagram of an outlet nozzle,

FIG. 3 shows a schematic sectional side view of a jet engine and the outlet nozzle according to FIG. 2, FIG. 6 shows different directions of the gas flow thrust vector relative to a center line through the nozzle, FIG. 7 shows a parallel shifting of the thrust vector relative to a center line through the nozzle.

DETAILED DESCRIPTION

Figure 1:
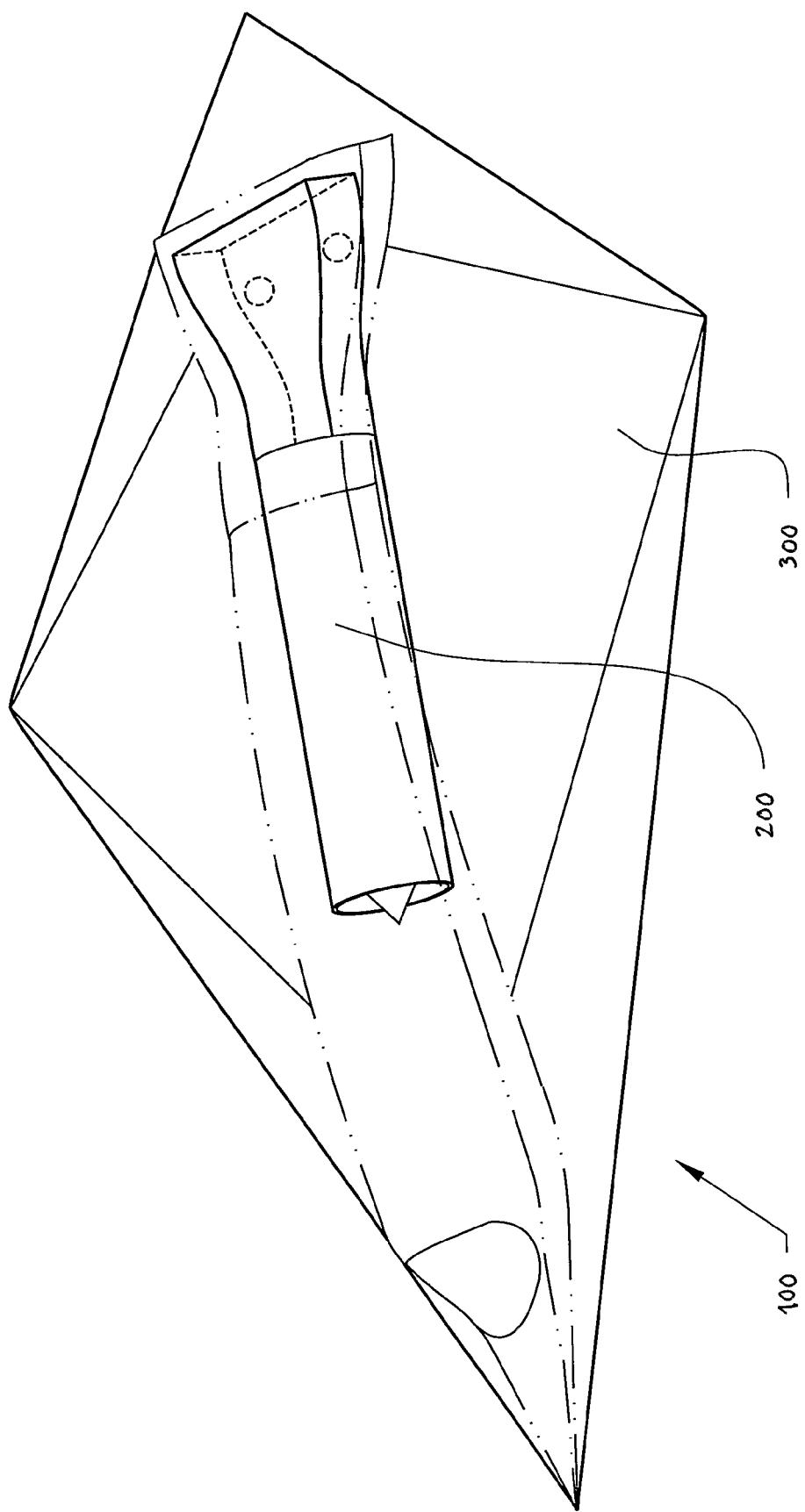
FIG. 1 shows a perspective view of an airplane.

FIG. 1 shows a schematic perspective view of an airplane 100 in the form of a stealth airplane without tail fin. A jet engine 200 is located centrally in the airplane fuselage. An outlet nozzle 1 is arranged downstream of the jet engine 200, see FIG. 3. A wing 300 projects outwards in both directions from the airplane fuselage laterally to the airplane.

The jet engine 200 is shown schematically in FIG. 3. The jet engine comprises a compressor section 25 for compression of the intake air, a combustion chamber 26 for combustion of the compressed air and a turbine section 27 arranged downstream of the combustion chamber in the direction of flow, the turbine section 27 being rotationally connected to the compressor section 25 in order to drive this by means of the energy-rich gas from the combustion chamber 26.

The compressor section 25 comprises a low-pressure part 28, or fan, and a high-pressure part 29. The turbine section 27 comprises a high-pressure part 30 and a low- pressure part 31. The high-pressure compressor 29 is rotationally locked to the high-pressure turbine 30 via a first shaft 32 and the low-pressure compressor 28 is rotationally locked to the low-pressure turbine 31 via a second shaft 33. In this way a high-pressure rotor and a low-pressure rotor are formed. These are supported concentrically and rotate freely in relation to one another. The direction of gas flow in the engine is therefore from left to right in FIG. 3.

FIGS. 2 and 3 show the principle according to the invention for controlling a gas flow through and out of an outlet nozzle 1, the gas flow coming from the jet engine 200. The nozzle 1 has a gas intake 2 for connection to the jet engine 200 and a gas outlet 3. The nozzle 1 has a circular inner cross-sectional shape at the gas intake 2 and an oblong inner cross-sectional shape at the gas outlet 3. The nozzle 1 forms a basically smooth transition between the circular shape of the gas intake 2 and the oblong shape of the gas outlet 3.

The oblong shape defines a long transverse axis and a short transverse axis of the gas outlet 3. The jet engine is furthermore preferably intended to be arranged in a craft so that the long transverse axis extends in the lateral direction of the craft and the short transverse axis extends in the vertical direction of the craft. A large width/height ratio of the oblong shape is advantageous in terms of the radar signature. In FIG. 2 the gas outlet 3 has a basically rectangular cross-sectional shape. The long sides of the rectangular shape therefore form a top and bottom side of the nozzle 1. The nozzle 1 has a greater width parallel to said long transverse axis at the outlet 3 than the diameter of the circular shape of the gas intake at the gas intake 2.

The nozzle 1 has a convergent shape in the vertical direction of the nozzle along a first section in an axial direction away from the gas intake 2 towards the gas outlet 3, and a divergent shape in the vertical direction of the nozzle along a second section 5, downstream of the first section 4, in an axial direction away from the gas intake 2 towards the gas outlet 3, see FIG. 3.

Figure 4:
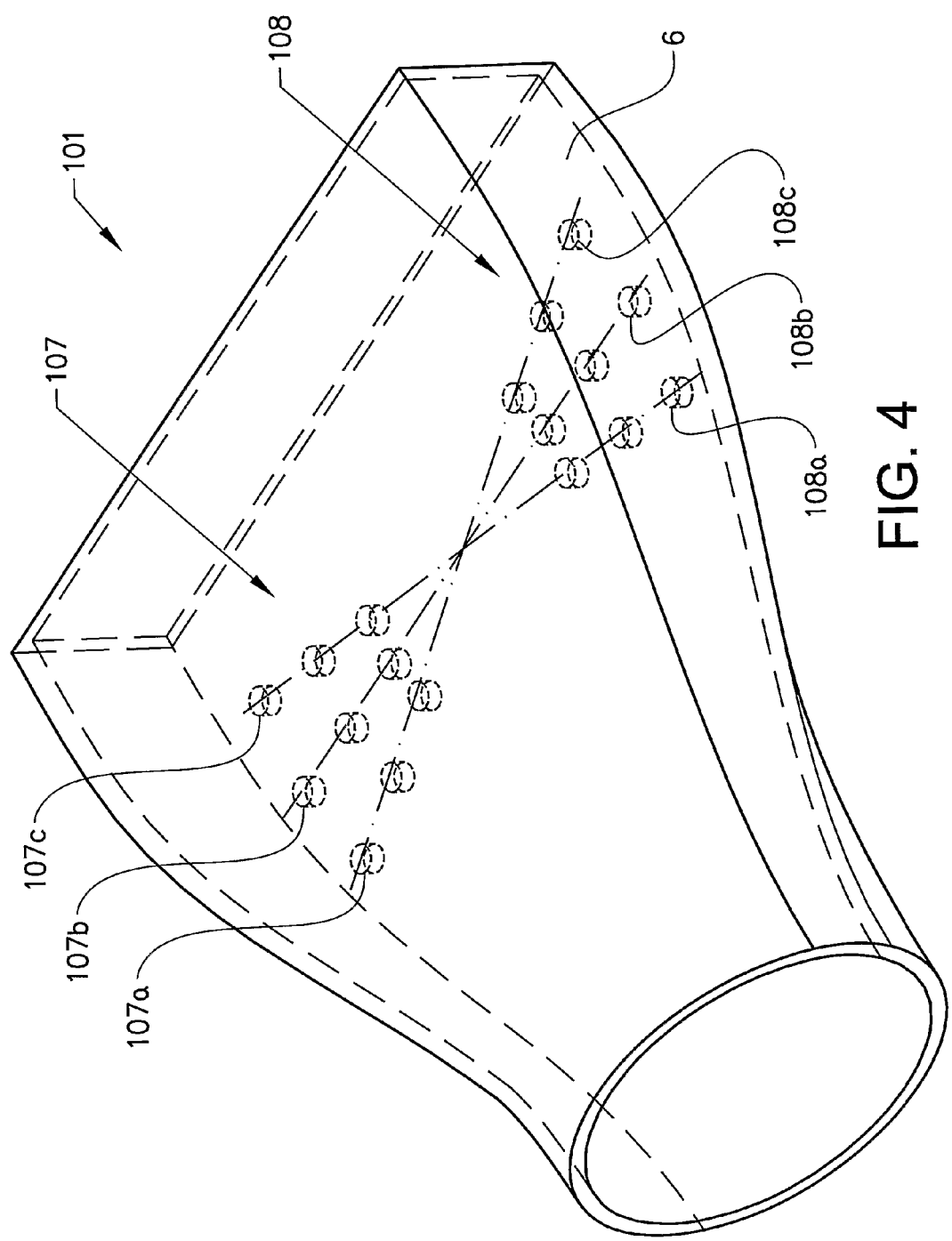
FIG. 4 shows a schematic representation of a first embodiment of an outlet nozzle.

A bottom surface 6 of the nozzle 1 is provided with a plurality of openings through the nozzle boundary wall for the injection of a fluid, suitably air, into the nozzle for the purpose of controlling the direction of a gas flow from the jet engine out of the nozzle, the openings in FIG. 1 being shown in simplified form with a first and second opening area 7, 8. Two examples of how the openings are arranged within each area 7, 8 are described below and are illustrated in FIGS. 3 and 4. The opening areas 7, 8 through the boundary wall of the nozzle 1 are arranged in an area of the nozzle at the waisted section 9 thereof, that is to say in the interface area between the first convergent section 4 and the second divergent section 5. The opening areas 7, 8 are here arranged at a distance downstream of the waisted section 9. The two opening areas 7, 8 are furthermore arranged on different sides of a center line through the nozzle 1.

The nozzle 1 comprises means 10 for selective injection of the fluid through said openings to a varying extent on different sides of the nozzle center line, for the purpose of controlling and/or shifting the gas flow in the lateral direction of the nozzle.

The nozzle 1 accordingly has a convergent-divergent area distribution and the effective minimum area can, for example, be shifted downstream, see arrow 11 FIG. 3, by expelling the fluid through one or more of the openings 7 on one side of the center line and then vectoring in the other direction by expelling the fluid through one or more of the openings 8 on the other side of the center line.

The injection of the fluid therefore occurs in a direction perpendicular to one plane, which here can be said to be defined by a bottom surface 6 of the nozzle 1, and vectoring occurs substantially tangentially in this plane. For a rectangular outlet where deflection in the direction of the long side is desired, the air is injected through the surface(s) constituting the long sides of the rectangle. Should the outlet nozzle be arranged behind the jet engine in the air plane, the primary flow is therefore vectored in the lateral direction of the airplane, or transversely. This produces a yaw vectoring. Influencing of the gas flow from the jet engine is based on the principle that the gas flow (the air flow) accelerates when it meets an obstacle in the form of the injected fluid. If the pressure ratio is sufficiently great, it will continue to accelerate after passing the injection. This is illustrated by the arrows 12-15 in FIG. 3. The nozzle 1 contains a mechanical contraction in the form of waisted section 9, which means that the gas flow accelerates, which is illustrated by the fact that the second arrow 13 is longer than the first arrow 12. The contraction becomes narrower by dint of the fact that the fluid is injected from the side, see the arrow 10, in relation to the gas flow, which leads to further acceleration, which is illustrated by the fact that the third arrow 14 is longer than the second arrow 13. The injected fluid is drawn towards the outlet 3 by pressure and frictional forces, which means that the constriction presented to the gas flow diminishes, and the area increase, see arrow 16, and the gas flow accelerates further, which is illustrated by the fact that the fourth arrow 15 is longer than the third arrow 14.

FIG. 4 shows an outlet nozzle 101 according to a first embodiment. The bottom surface 6 of the nozzle 1 is provided with a plurality of first openings 107a, 107b, 107c, in the form of smaller punctual holes, within the first area 107 and a plurality of second openings 108a, 108b, 108c, in the form of smaller punctual holes, within the second area 108. The openings 107a, 107b, 107c, 108a, 108b, 108c are provided in the vicinity of the gas outlet 3.

A first set of said openings 107a, 107b, 107c is therefore provided through the nozzle boundary wall on a first side of the nozzle center line and a second set of openings 108a, 108b, 108c is provided through the nozzle boundary wall on a second side of the nozzle center line. At least two of said openings 107a, 107b, 107c and 108a, 108b, 108c respectively are arranged at different distances in the axial direction of the nozzle. At least two of said openings 107a, 108a are arranged at different distances transversely to the axial direction of the nozzle 1. According to the embodiment shown three rows of three openings each are provided through the bottom surface 6 on each side about the axial direction of the nozzle 1, the rows extending in a transverse direction to the axial direction of the nozzle. The rows of openings have different angles from one another. Each of these rows of openings can thereby form a so-called ramp for controlling a jet from the jet engine.

Figure 5:
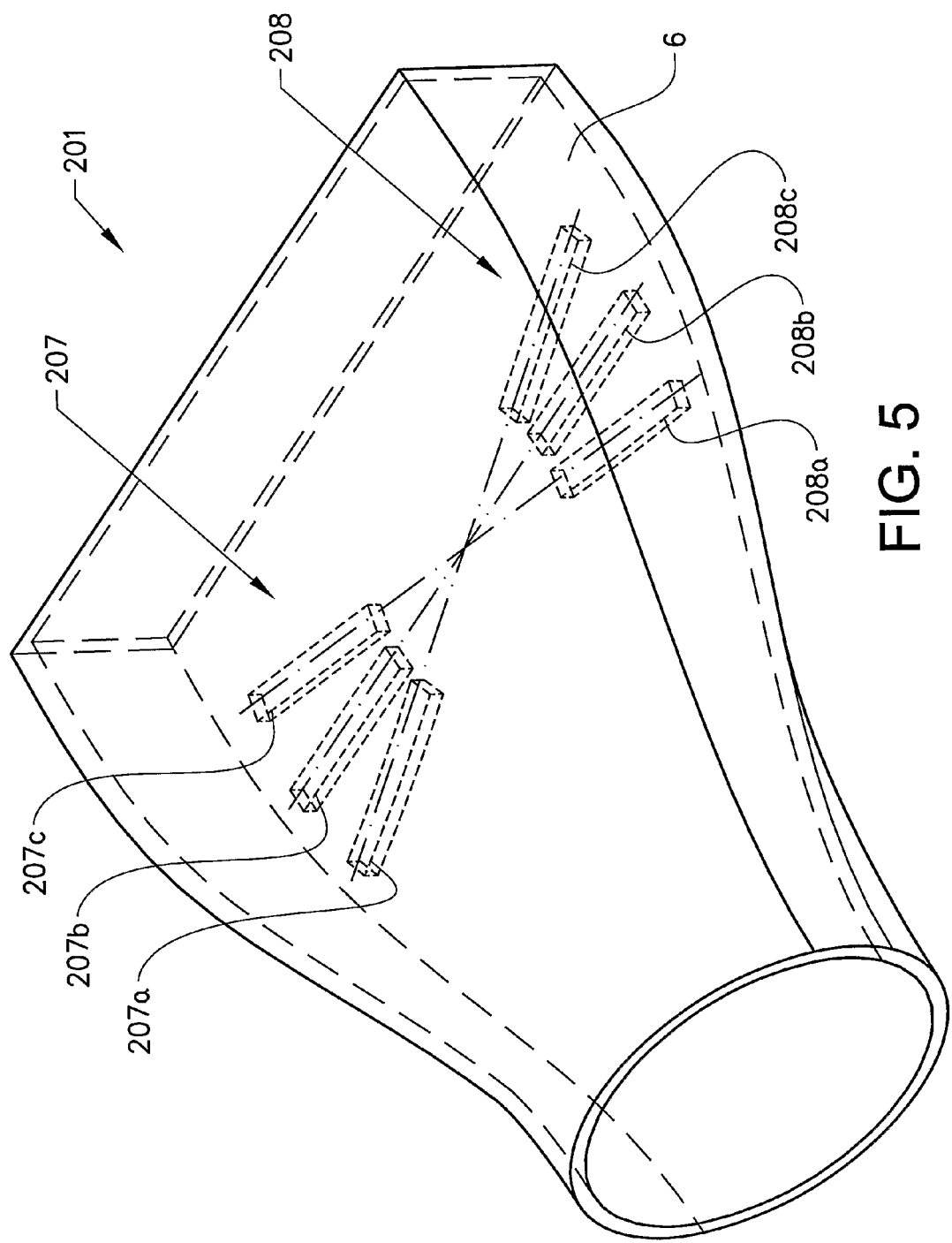
FIG. 5 shows a schematic representation of a second embodiment of an outlet nozzle.

FIG. 5 shows an outlet nozzle 201 according to a second embodiment. The bottom surface 6 of the nozzle 1 is provided with a plurality of first openings 207a, 207b, 207c, in the form of elongated slots, within the first area 207 and a plurality of second openings 208a, 208b, 208c, in form of elongated slots, within the second area 208. Each of said slots corresponds functionally to a row of three openings according to the first embodiment.

FIG. 6 shows how the direction of the thrust vector out of the nozzle 1 is controlled. This is illustrated by the fact that a thrust vector Fa1, which has a direction parallel to the center line of the nozzle 1, that is to say straight backwards, can be adjusted so that the direction of the thrust vector acquires an angle relative to the center line of the nozzle 1, see the thrust vectors Fb1 and Fc1. The direction of the thrust vector is therefore adjusted in the lateral direction of the nozzle 1. This can be achieved by shifting the position of the effective minimum area of the gas flow in the axial direction of the nozzle, so that the position becomes different for the left and right-hand side of the nozzle.

FIG. 7 shows the displacement, or parallel-shifting of the thrust vector in the lateral direction of the nozzle 1. This is illustrated by the fact that a thrust vector Fax, which has a direction parallel to the center line of the nozzle 1 and is located centrally in the lateral direction of the nozzle, can be parallel shifted in the lateral direction of the nozzle; see the thrust vectors Fb2 and Fc2. This can be achieved by adjusting the size of the effective minimum area of the gas flow, so that the size becomes different for the left-hand side and the right-hand side of the nozzle respectively.

In practice the two effects (control and parallel shifting) can be produced simultaneously.

Figure 8:
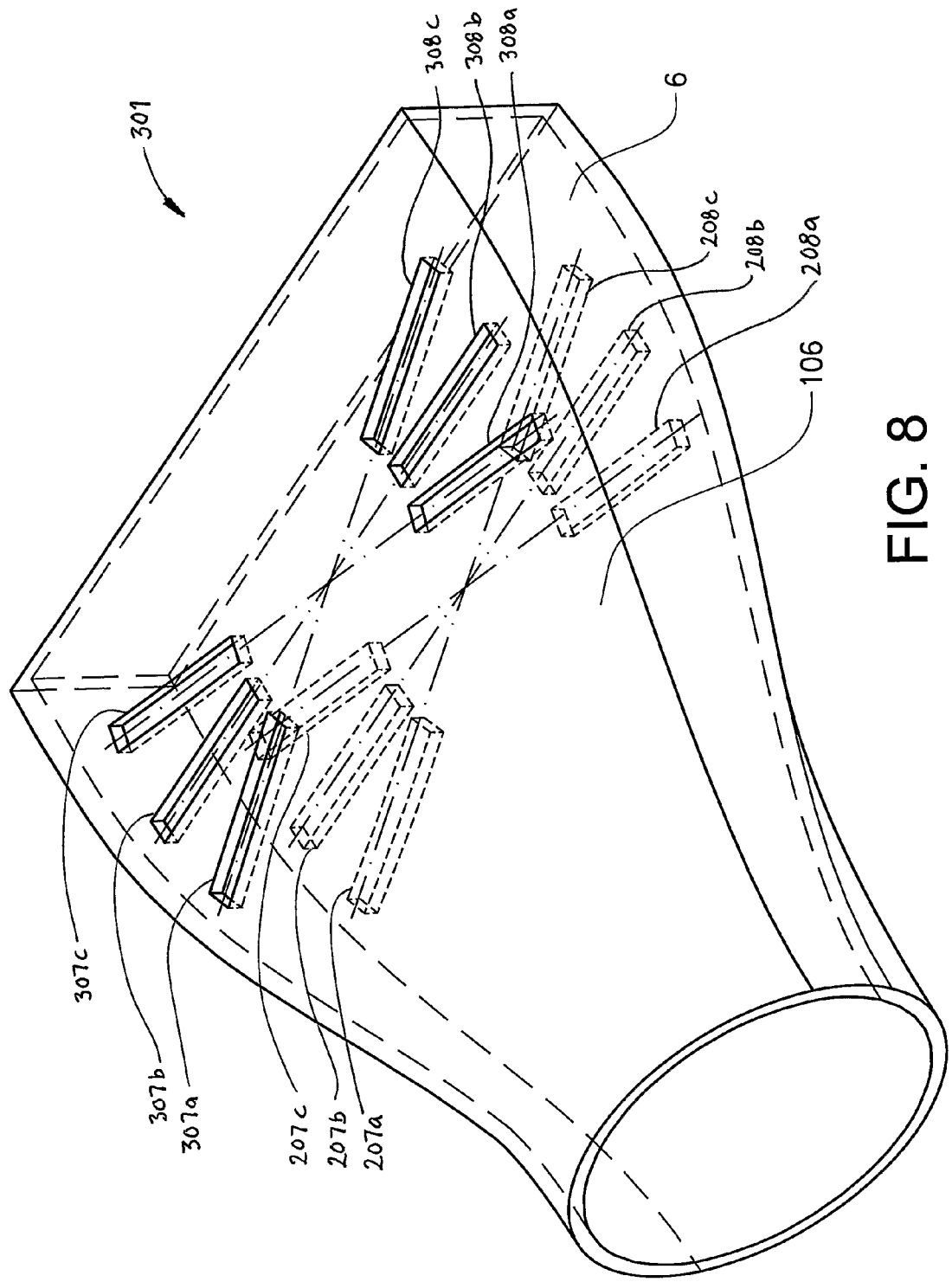
FIG. 8 shows a schematic representation of a third embodiment of an outlet nozzle.

FIG. 8 shows an outlet nozzle 301 according to a third embodiment. A third opening configuration 307, 308 is provided through the nozzle boundary wall on an opposite side of the first opening configuration 207, 208 in relation to the interior of the nozzle. The second and third opening configuration 207, 208; 307, 308 are accordingly arranged on opposite sides of the nozzle in the vertical direction thereof. Said opening configurations 207, 208; 307, 308 on opposite sides of the interior of the nozzle have the same shape and placing in the nozzle. The lower opening configuration 207, 208 can be said to be projected onto the opposite, upper boundary wall.

The following relates generally to each of the three opening configurations 107, 108; 207, 208; 307, 308. The opening configuration has a substantial extension in the axial direction of the nozzle and comprises at least one elongated opening structure. The elongated opening structure extends basically in a straight line. There are at least two elongated opening structures, which extend in different directions. More specifically the elongated opening configuration has at least one component perpendicular to the axial direction of the nozzle. There is furthermore a plurality of elongated opening structures.

The elongated opening structures extend in different directions so that they cross one another at a point of intersection. The elongated opening structures can be said to form a cruciform or star shape. The point of intersection is preferably central on all lines and coincides with a center line through the inner boundary surface of the outlet, parallel to the axial direction of the nozzle.

Any type of regulating device (not shown) comprising a plurality of valves can be used in order to control the fluid for correct opening.

The mass flow of injected fluid may be varied in order to produce a varying degree grad of vectoring or area control.

The expression "basically rectangular" used above includes a rectangle with rounded corners, that is to say the corners do not present a right angle.

The invention must not be regarded as being limited to the exemplary embodiments described above, a number of further variants and modifications being feasible without departing from the scope of the following patent claims.

As an alternative to a rectangular cross-sectional shape, an elliptical cross-sectional shape, for example, may also be feasible. It would furthermore be possible to perform the vectoring with a single opening by designing a nozzle which expels the gas flow (the jet) obliquely backwards and using a varying quantity of injected air to turn it straight backwards and then over to the other side.

In an alternative to the elongated opening configuration extending basically in a straight line, it may be curved, partially circular etc.

The invention claimed is:

1. An outlet nozzle for a jet engine, comprising a gas intake and a gas outlet, at least one opening being provided through a nozzle boundary-wall for injection of a fluid into the nozzle in a direction perpendicular to one plane to control a direction of a gas flow from the jet engine so that vectoring occurs substantially tangentially in the plane, wherein a first opening configuration is provided through the nozzle boundary wall on a first side of a nozzle center line and a second opening configuration is provided through the nozzle boundary wall on a second side of the nozzle center line, and at least one of the first and second opening configurations has a substantial extension in an axial direction of the nozzle in order to permit selective injection of fluid through the first and second opening configurations to a varying extent in the axial direction of the nozzle, wherein the nozzle has an oblong, fixed geometry inner cross-sectional shape at the gas outlet in a lateral direction thereof, the fixed geometry inner cross-sectional shape having two long sides and two short sides.

2. The outlet nozzle as claimed in claim 1, wherein both the first and second opening configuration have a substantial extension in the axial direction of the nozzle.

3. The outlet nozzle as claimed in claim 1, wherein at least one of the first and second opening configurations comprises at least one elongated opening structure.

4. The outlet nozzle as claimed in claim 3, wherein the elongated opening structure extends basically in a straight line.

5. The outlet nozzle as claimed in claim 3, wherein there are at least two elongated opening structures of the first and second opening configurations, the at least two elongated opening structures extending in different directions.

6. The outlet nozzle as claimed in claim 3, wherein the at least one elongated opening configuration has at least one component perpendicular to the axial direction of the nozzle.

7. The outlet nozzle as claimed in claim 1, wherein at least one of the first and second opening configurations comprises a plurality of openings.

8. The outlet nozzle as claimed in claim 1, wherein at least one of the first and second opening configurations comprises a slot-shaped opening.

9. The outlet nozzle as claimed in claim 1, wherein both the first and the second opening configuration are situated in the nozzle boundary wall on a same side of an interior of the outlet.

10. The outlet nozzle as claimed in claim 1, wherein a third opening configuration is provided through the nozzle boundary wall on an opposite side of the first opening configuration in relation to an interior of the nozzle.

11. The outlet nozzle as claimed in claim 10, wherein the first and second opening configurations on opposite sides of the nozzle interior have at least one of a same shape placement in the nozzle.

12. The outlet nozzle as claimed in claim 1, wherein the first and second opening configuration is provided proximate the gas outlet.

13. The outlet nozzle as claimed in claim 1, wherein the nozzle has a basically rectangular inner cross-sectional shape at the gas outlet in a lateral direction thereof.

14. The outlet nozzle as claimed in claim 1, wherein at least one of the first and second opening configurations is provided through the nozzle boundary wall in at least one of the two long sides of the inner cross-sectional shape.

15. The outlet nozzle as claimed in claim 1, wherein at least two of the openings of the first and second opening configurations are arranged at different distances transversely to the axial direction of the nozzle.

16. The outlet nozzle as claimed in claim 1, wherein the nozzle comprises means for selective injection of the fluid through the first and second opening configurations to a varying extent on different sides of a center line through the nozzle for the purpose of controlling gas flow in a lateral direction of the nozzle.

17. The outlet nozzle as claimed in claim 1, wherein the nozzle comprises means for selective injection of the fluid through the first and second opening configurations to a varying extent at a top and bottom of the nozzle for the purpose of controlling the gas flow in a vertical direction of the nozzle.

18. The outlet nozzle as claimed in claim 1, wherein the nozzle has a convergent shape in a vertical direction of the nozzle along a first section in an axial direction away from the gas intake.

19. The outlet nozzle as claimed in claim 18, wherein the nozzle has a divergent shape in a vertical direction of the nozzle along a second section in an axial direction away from the gas intake.

20. The outlet nozzle as claimed in claim 19, wherein the second section is arranged behind the first section in a direction away from the gas intake.

21. The outlet nozzle as claimed in claim 19, wherein the first and second opening configurations are arranged in the vicinity of the end of the convergent first section.

22. The outlet nozzle as claimed in claim 21, wherein the first and second opening configurations are arranged in the vicinity of the beginning of the divergent second section.

23. An aircraft comprising a propulsion source and an outlet nozzle as claimed in claim 1 arranged downstream of the propulsion source.

24. An outlet nozzle for a jet engine, comprising a gas intake and a gas outlet, at least one opening being provided through a nozzle boundary-wall for injection of a fluid into the nozzle in a direction perpendicular to one plane to control a direction of a gas flow from the jet engine so that vectoring occurs substantially tangentially in the plane, wherein a first opening configuration is provided through the nozzle boundary wall on a first side of a nozzle center line and a second opening configuration is provided through the nozzle boundary wall on a second side of the nozzle center line, and at least one of the first and second opening configurations has a substantial extension in an axial direction of the nozzle in order to permit selective injection of fluid through the opening configuration to a varying extent in the axial direction of the nozzle, wherein at least one of the first and second opening configurations comprises at least one elongated opening structure and there is a plurality of elongated opening structures and the plurality of elongated opening structures extend in different directions so that they cross one another at a point of intersection, wherein at least one of the first and second opening configurations comprises at least one elongated opening structure and the at least one elongated opening structure has at least two sides.

25. An outlet nozzle for a jet engine, comprising a gas intake and a gas outlet, at least one opening being provided through a nozzle boundary-wall for injection of a fluid into the nozzle in a direction perpendicular to one plane to control a direction of a gas flow from the jet engine so that vectoring occurs substantially tangentially in the plan, wherein a first opening configuration is provided through the nozzle boundary wall on a first side of a nozzle center line and a second opening configuration is provided through the nozzle boundary wall on a second side of the nozzle center line, and at least one of the first and second opening configurations has a substantial extension in an axial direction of the nozzle in order to permit selective injection of fluid through the at least one of the first and second opening configurations to a varying extent in the axial direction of the nozzle, wherein the nozzle has an oblong fixed geometry inner cross-sectional shape at the gas outlet in a lateral direction thereof, the fixed geometry inner cross- sectional shape having two long sides and two short sides, wherein the nozzle has a circular inner cross-sectional shape at the gas intake.

* * * * *